(12) United States Patent
Ouchi

(10) Patent No.: US 10,577,067 B1
(45) Date of Patent: Mar. 3, 2020

(54) ZERO EMISSION POWER GENERATION SAILING SHIP

(71) Applicant: Ouchi Ocean Consultant, Inc., Nagano (JP)

(72) Inventor: Kazuyuki Ouchi, Nagano (JP)

(73) Assignee: OUCHI OCEAN CONSULTANT, INC., Nagano (JP)

(*) Notice: Subject to any disclaimer, the term of this patent is extended or adjusted under 35 U.S.C. 154(b) by 0 days.

(21) Appl. No.: 16/259,010

(22) Filed: Jan. 28, 2019

(51) Int. Cl.
  *B63H 21/20* (2006.01)
  *B63H 21/17* (2006.01)
  (Continued)

(52) U.S. Cl.
  CPC .............. *B63H 21/20* (2013.01); *B60L 50/70* (2019.02); *B63H 1/14* (2013.01); *B63H 9/0607* (2013.01);
  (Continued)

(58) Field of Classification Search
  CPC .......... B63H 21/20; B63H 21/17; B63H 1/14; B63H 9/0607
  See application file for complete search history.

(56) References Cited

U.S. PATENT DOCUMENTS

| | | | |
|---|---|---|---|
| 9,422,918 B2 * | 8/2016 | Lind | F03D 7/0204 |
| 2009/0189396 A1 | 7/2009 | Terao | |

FOREIGN PATENT DOCUMENTS

| | | |
|---|---|---|
| EP | 2 722 272 A1 | 4/2014 |
| JP | 2001-270496 A | 10/2001 |

(Continued)

OTHER PUBLICATIONS

Extended European Search Report issued in co-pending application 18207921.0, completed May 13, 2019 and dated May 20, 2019.
(Continued)

*Primary Examiner* — Stephen P Avila
(74) *Attorney, Agent, or Firm* — Merchant & Gould, P.C.

(57) ABSTRACT

[Problem to be solved] An object of the present invention is to provide a zero emission power generation sailing ship, wherein generated electric power is consumed for electric demand in the ship or consumed for electric demand in the ship and for driving the ship in response to wind condition, thereby realizing zero emission navigation.
[Means for solving the problem] A zero emission power generation sailing ship comprises a sail provided on a deck, a water turbine-propeller, a power generator-motor which is driven by the water turbine-propeller operating as a water turbine and drives the water turbine-propeller operating as a propeller, and an energy storage device for directly storing electric energy generated by the power generator-motor or converting the electric energy into energy of a substance and storing the substance, wherein the water turbine-propeller operates as a water turbine and the power generator-motor operates as a power generator so as to generate electric power and a part of the generated electric power is consumed for electric demand in the ship and residual part of the generated electric power is stored in the energy storage device when the wind is strong, while the power generator-motor operates as a motor and the water turbine-propeller operates as a propeller and a part of the electric power drawn from the energy storage device is consumed for electric demand in the ship and residual part of the electric power is consumed for driving the power generator-motor operating as a motor when the wind is light, and further comprises a course selecting device provided with a computer program for selecting course based on ocean wind forecasting data so as to prevent exhaustion of the electric power stored in the energy storage device.

7 Claims, 2 Drawing Sheets

(51) Int. Cl.
  *B60L 50/70* (2019.01)
  *G05D 1/02* (2020.01)
  *B63H 9/06* (2020.01)
  *H01M 8/0656* (2016.01)
  *C25B 1/04* (2006.01)
  *B63H 1/14* (2006.01)
  *B63H 5/125* (2006.01)

(52) U.S. Cl.
  CPC ............... *B63H 21/17* (2013.01); *C25B 1/04* (2013.01); *G05D 1/0206* (2013.01); *H01M 8/0656* (2013.01); *B60L 2200/32* (2013.01); *B63H 5/125* (2013.01); *B63H 2005/1254* (2013.01); *H01M 2250/20* (2013.01)

(56) References Cited

FOREIGN PATENT DOCUMENTS

| | | |
|---|---|---|
| JP | 2014-184935 A | 10/2014 |
| KR | 10-2017-0012015 | 2/2017 |
| WO | 2005/012079 A1 | 2/2005 |

OTHER PUBLICATIONS

Ibrahim S Seediek et al: "Double Acting Diesel Engine View project Study of optimum design features of marine diesel engine View project the Hydrogen-Fuelled Internal Combustion Engines for Marine Applications With a Case Study", Dec. 31, 2015 (Dec. 31, 2015), XP(;J55587931, Retrieved from the Internet: URL:https://www.researchgate.net/publication/275658599 The hydrogen-fuelled internal combustion engines for marine applications with a case study [retrieved on-May 13, 2019] * p. 35 *.

A software for selecting optimized course of a sailing ship WCNavi : Collection of lecture resumes p43-52, Result reports session of Wind Challenger Developing Plan Sep. 30, 2017.

Office Action issued in co-pending Japanese application 2018-175979 dated Oct. 25, 2019.

Aoki, Shigemitsu et al., OWHV: Ocean Energy Harvesting Vessel, Concept of Ocean Energy Harvesting Vessel, dated Dec. 22, 2017 and published in Nihon Enerugii Gakkai Kikanishi Enermix, vol. 97, No. 2, Mar. 2018.

* cited by examiner

ZERO EMISSION POWER GENERATION SAILING SHIP

This application claims priority from Japanese Patent Application No. 2018-175979, filed Sep. 20, 2018, the entire disclosure of which is incorporated herein by reference.

TECHNICAL FIELD

The present invention relates to a zero emission power generation sailing ship.

BACKGROUND OF THE INVENTION

The applicant of the present invention proposed in Patent Document No. 1 a power generation sailing ship comprising a sail provided on a deck, a water turbine located outside a hull, a power generator driven by the water turbine, a water electrolyzing device driven by the electric power generated by the power generator, a hydrogenated aromatic compound generator for reacting aromatic compound with hydrogen generated by the water electrolyzing device so as to generate hydrogenated aromatic compound, and aromatic compound/hydrogenated aromatic compound storage tanks, wherein ocean wind power is converted to electric power, the electric power is converted to hydrogen, the hydrogen is converted to hydrogenated aromatic compound which is stable substance, and the hydrogenated aromatic compound is safely sea transported to a land energy base.

PRIOR ART DOCUMENTS

Patent Document

Patent Document No. 1: Japanese Patent No. 6320356 B2 (US2017/022976 A1, EP3121109 A1)

Non-Patent Document

Non-Patent Document No. 1: A software for selecting optimized course of a sailing ship WCNavi: Collection of lecture resumes p 43-52, Result reports session of WIND CHALLENGER DEVELOPING PLAN 30 Sep. 2017

DISCLOSURE OF INVENTION

Problem to be Solved

An object of the present invention is to take the power generation sailing ship of Japanese Patent No. 6320356 a step further so as to provide a zero emission power generation sailing ship, wherein generated electric power is consumed for electric demand in the ship or consumed for electric demand in the ship and for driving the ship in response to wind condition, thereby realizing zero emission navigation.

Means for Solving the Problem

In accordance with the present invention, there is provided a zero emission power generation sailing ship comprising a sail provided on a deck, a water turbine-propeller, a power generator-motor which is driven by the water turbine-propeller operating as a water turbine and drives the water turbine-propeller operating as a propeller, and an energy storage device for directly storing electric energy generated by the power generator-motor or converting the electric energy into energy of a substance and storing the substance, wherein the water turbine-propeller operates as a water turbine and the power generator-motor operates as a power generator so as to generate electric power and a part of the generated electric power is consumed for electric demand in the ship and residual part of the generated electric power is stored in the energy storage device when the wind is strong, while the power generator-motor operates as a motor and the water turbine-propeller operates as a propeller and a part of the electric power drawn from the energy storage device is consumed for electric demand in the ship and residual part of the electric power is consumed for driving the power generator-motor operating as a motor when the wind is light, and further comprising a course selecting device provided with a computer program for selecting course based on ocean wind forecasting data so as to prevent exhaustion of the electric power stored in the energy storage device.

Zero emission navigation wherein discharge amount of carbon dioxide is zero can be realized by converting ocean wind power to electric power, consuming a part of the electric power for electric demand in the ship and storing residual part of the electric power in an energy storage device when the wind is strong, while consuming a part of the electric power drawn from the energy storage device for electric demand in the ship and residual part of the electric power for driving the ship when the wind is light, and also selecting course of the ship with a course selecting device provided with a computer program for selecting course based on ocean wind forecasting data so as to prevent exhaustion of the electric power stored in the energy storage device.

In accordance with a preferred aspect of the present invention, the zero emission power generation sailing ship comprises a water electrolyzing device driven by the electric power generated by the power generator-motor, a hydrogenated aromatic compound generator for reacting aromatic compound with hydrogen generated by the water electrolyzing device so as to generate hydrogenated aromatic compound, an aromatic compound storage tank, a hydrogenated aromatic compound storage tank, a hydrogen separator for separating hydrogenated aromatic compound into hydrogen and aromatic compound, and a hydrogen fueled power generator.

Hydrogenated aromatic compounds, which are reaction products between aromatic compounds and hydrogen, are stable substances that assume liquid state under normal temperature and normal pressure. Therefore, stable storage of electric energy can be realized by converting electric energy to hydrogenated aromatic compounds.

In accordance with a preferred aspect of the present invention, the hydrogen fueled power generator is a hydrogen fueled diesel engine.

In accordance with a preferred aspect of the present invention, the hydrogen fueled power generator is a fuel cell battery.

The hydrogen fueled power generator can be a hydrogen fueled diesel engine or a fuel cell battery. When a fuel cell battery is used as the hydrogen fueled power generator, emission of nitrogen oxides can be prevented.

In accordance with a preferred aspect of the present invention, the aromatic compound is benzene, toluene or naphthalene, and the hydrogenated aromatic compound is cyclohexane, methylcyclohexane or decalin.

Benzene, toluene and naphthalene are suitable for hydrogen carrier.

Effect of the Invention

In accordance with the present invention, there is provided a zero emission power generation sailing ship wherein generated electric power is consumed for electric demand in the ship or consumed for electric demand in the ship and for driving the ship in response to wind condition, thereby realizing zero emission navigation.

MODES FOR CARRYING OUT THE INVENTION

Zero emission power generation sailing ships in accordance with preferred embodiments of the present invention will be described.

Figure 1:
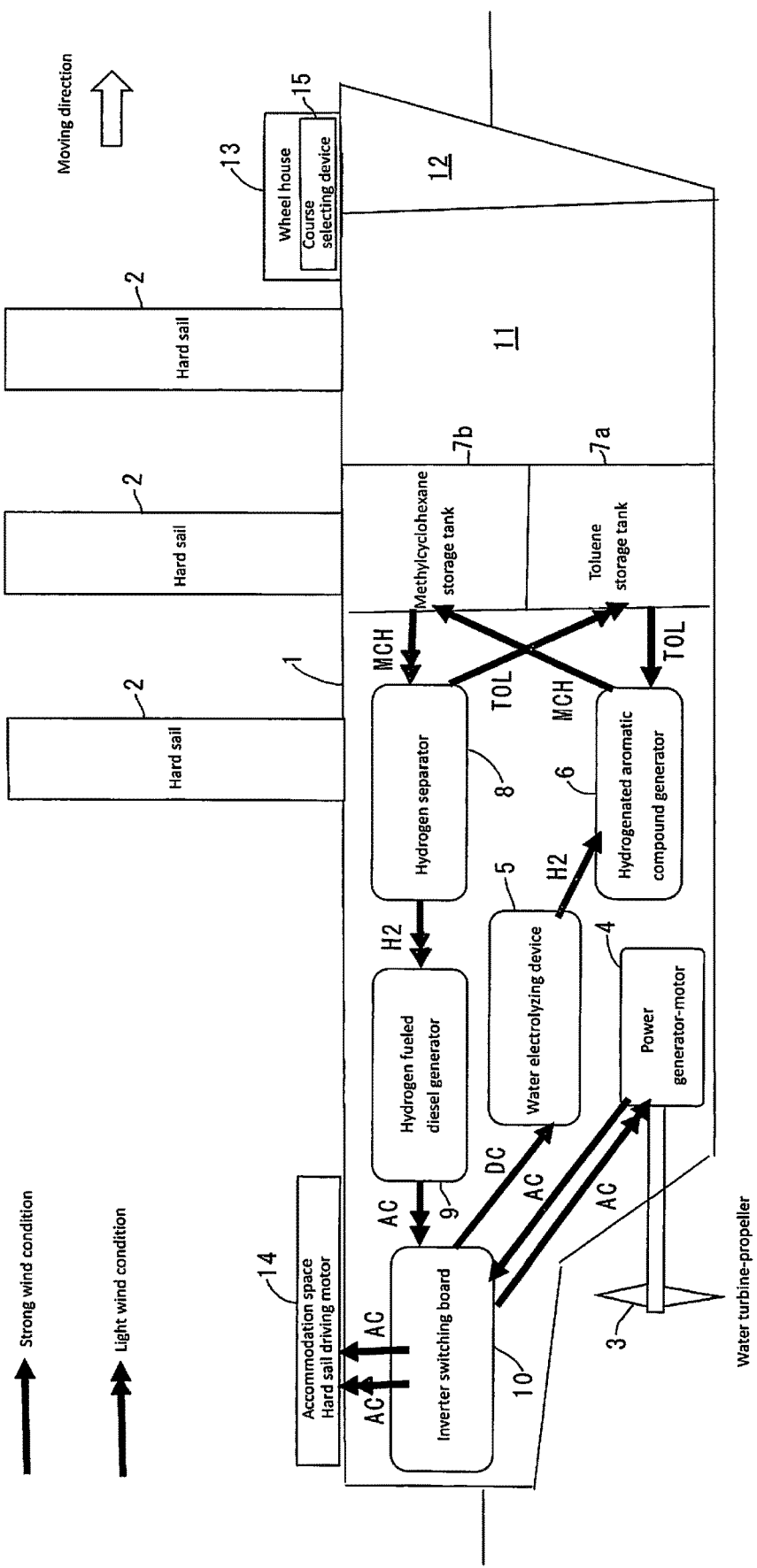
FIG. 1 is a structural view of a zero emission power generation sailing ship in accordance with a first preferred embodiment of the present invention.

As shown in FIG. 1, a power generation sailing ship 1 comprises a plurality of vertically telescopic hard sails 2 provided on a deck, a water turbine-propeller 3, a power generator-motor 4 which is driven by the water turbine-propeller 3 operating as a water turbine and drives the water turbine-propeller 3 operating as a propeller, a water electrolyzing device 5 driven by the electric power generated by the power generator-motor 4, a hydrogenated aromatic compound generator 6 for reacting toluene (TOL), which is an aromatic compound with hydrogen (H2) generated by the water electrolyzing device 5 so as to generate methylcyclohexane (MCH), which is a hydrogenated aromatic compound, a toluene storage tank 7a, a methylcyclohexane storage tank 7b, a hydrogen separator 8 for separating methylcyclohexane into hydrogen and toluene, and a hydrogen fueled diesel power generator 9. The power generator-motor 4 and the water electrolyzing device 5 are connected to each other through an inverter switchboard 10. The hydrogen fueled diesel power generator 9 and the power generator-motor 4 are also connected to each other through the inverter switchboard 10.

The water turbine-propeller 3 is located outside a stern hull. The power generator-motor 4, the water electrolyzing device 5, the hydrogenated aromatic compound generator 6, the toluene storage tank 7a, the methylcyclohexane storage tank 7b, the hydrogen separator 8, the hydrogen fueled diesel power generator 9, and the inverter switchboard 10 are located in the stern hull.

The power generation sailing ship 1 is a cargo ship and comprises a cargo space 11, a bow water ballast tank 12, a wheel house 13, an accommodation space 14, and various kinds of facilities not shown in FIG. 1, such as pumps, cargo facilities, etc., which are necessary for a cargo ship.

The wheel house 13 is provided with a course selecting device 15 which is provided with a computer program for selecting course based on ocean wind forecasting data so as to prevent exhaustion of the electric power stored in the energy storage device, more specifically, methylcyclohexane stored in the methylcyclohexane storage tank 7b.

Operation of the power generation sailing ship 1 will be described.

When the power generation sailing ship 1 begins navigation, the toluene storage tank 7a is half filled with toluene and the methylcyclohexane storage tank 7b is half filled with methylcyclohexane.

The power generation sailing ship 1 moves basically by means of wind blowing on the hard sails 2.

The power generation sailing ship 1 moves in electric power generation mode when the wind is strong. Connection between the hydrogen fueled diesel generator 9 and the inverter switching board 10 is shut down. Ocean wind energy is converted to kinetic energy of the power generation sailing ship 1 through the hard sails 2 and the power generation sailing ship 1 moves.

The movement of the power generation sailing ship 1 generates sea water flow relative to the water turbine-propeller 3 so as to rotate the water turbine-propeller 3. The water turbine-propeller 3 operates as a water turbine so as to rotate the power generator-motor 4. The power generator-motor 4 operates as a power generator so as to generate electric power. A part of the generated AC electric power is supplied to the wheel house 13, accommodation space 14, motors for driving the hard sails 2 and various kinds of pumps and cargo facilities through the inverter switching board 10 as AC electric power and consumed for electric demand in the ship.

Residual part of the generated AC electric power is converted to DC electric power through the inverter switching board 10 and supplied to the water electrolyzing device 5. The water electrolyzing device 5 electrolyzes water so as to generate hydrogen. The generated hydrogen is supplied to the hydrogenated aromatic compound generator 6. Toluene is pump fed from the toluene storage tank 7a to the hydrogenated aromatic compound generator 6. Toluene and hydrogen react in the hydrogenated aromatic compound generator 6 so as to generate methylcyclohexane. Methylcyclohexane is pump fed from the hydrogenated aromatic compound generator 6 to and stored in the methylcyclohexane storage tank 7b.

A part of the ocean wind energy received by the hard sails 2 is converted to electric energy and consumed for electric demand in the ship and stored in the ship. Thus moving speed of the power generation sailing ship 1 is maintained at an appropriate level even under the strong wind.

The power generation sailing ship 1 moves in electrically driven mode when the wind is light. Connection between the water electrolyzing device 5 and the inverter switching board 10 is shut down.

Methylcyclohexane is pump fed from the methylcyclohexane storage tank 7b to the hydrogen separator 8. The hydrogen separator 8 separates methylcyclohexane into hydrogen and toluene. The separated toluene is pump fed to and stored in the toluene storage tank 7a. The separated hydrogen is supplied to the hydrogen fueled diesel generator 9. The hydrogen fueled diesel generator 9 operates by using hydrogen as fuel so as to generate electric power.

A part of the generated AC electric power is supplied to the wheel house 13, accommodation space 14, motors for driving the hard sails 2 and various kinds of pumps and cargo facilities through the inverter switching board 10 as AC electric power and consumed for electric demand in the ship.

Residual part of the generated AC electric power is supplied to the power generator-motor 4 through the inverter switching board 10 as AC electric power and consumed for driving the power generator-motor 4. The power generator-motor 4 operates as a motor so as to rotate the water turbine-propeller 3. The water turbine-propeller 3 operates as a propeller so as to drive and move the power generation sailing ship 1. Thus, decrease of ocean wind power received by the hard sails 2 under light wind is offset by the driving energy of the propeller, and moving speed of the power generation sailing ship 1 is maintained at an appropriate level even under the light wind.

The power generation sailing ship 1 can realize zero emission navigation wherein discharge amount of carbon dioxide is zero while accomplishing function of cargo ship provided that the size and the number of hard sails 2 and storage amount of the toluene storage tank 7a and the methylcyclohexane storage tank 7b are optimized so as to optimize storage amount of generated electric power, and course of the ship is selected by the course selecting device 15 provided with a computer program for selecting course based on ocean wind forecasting data so as to prevent exhaustion of methylcyclohexane in the methylcyclohexane storage tank 7b, and, in addition, navigation mode is appropriately switched depending on ocean wind condition between power generation mode and electrically driven mode. Ocean wind forecasting data are available from, for example, Japan's JRA-25 and JAR-55, USA's NCEP/NCAR Reanaylsis, NCEP CFSR and NCEP-MERA, and Europe's ERA-20C and ERA-interim. A computer program for selecting optimized course of a sailing ship based on aforementioned ocean wind forecasting data has been developed by Tokyo University (Refer to Non-Patent Document No. 1). Therefore, there can be developed a computer program for selecting optimized course of the power generation sailing ship 1 so as to prevent exhaustion of methylcyclohexane in the methylcyclohexane storage tank 7b by possessing aforementioned ocean wind forecasting data and using as reference the computer program for selecting optimized course of a sailing ship developed by Tokyo University.

Figure 2:
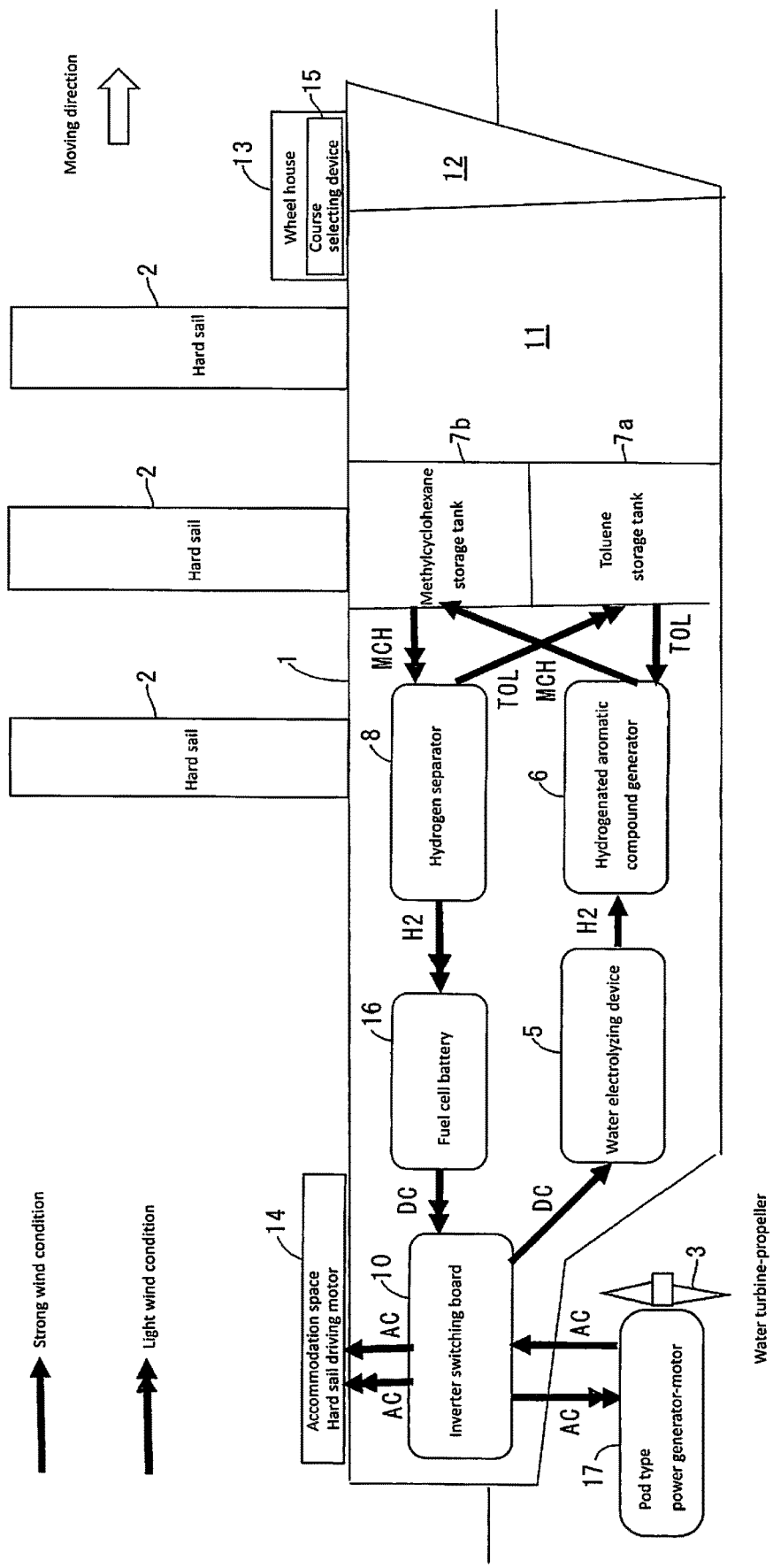
FIG. 2 is a structural view of a zero emission power generation sailing ship in accordance with a second preferred embodiment of the present invention.

The hydrogen fueled diesel generator 9 is used as a power generator using hydrogen as fuel in the aforementioned preferred embodiment. However, as shown in FIG. 2, a fuel cell battery 16 can be used instead of the hydrogen fueled diesel generator 9. In this case, generated DC electric power is converted to AC electric power through the inverter switching board 10 and consumed for electric demand in the ship and for driving power generator-motor 4. When a fuel cell battery 16 is used as the hydrogen fueled power generator, emission of nitrogen oxides can be prevented.

The power generator-motor 4 which is connected to the fixed axis water turbine-propeller 3 is installed in the ship hull in the aforementioned preferred embodiment. However, a pod type power generator-motor 17 comprising a power generator-motor connected to the water turbine-propeller 3 and installed in a pod can be located outside the ship hull as shown in FIG. 2. Power generating efficiency and steering performance can be enhanced by appropriately changing direction of the water turbine-propeller 3.

Toluene is used as hydrogen carrier in the aforementioned preferred embodiment. Other kind of aromatic compound such as benzene or naphthalene can also be used as hydrogen carrier. In this case, cyclohexane and decalin are generated as hydrogenated aromatic compounds.

Hydrogen is converted to methylcyclohexane and stored in the aforementioned preferred embodiment. However, hydrogen can be converted to ammonia and stored or adsorbed by hydrogen storage alloy made of rare earth elements such as lanthanum, cerium, etc., and nickel, cobalt, etc., and stored.

Hydrogen can be highly compressed or low-temperature liquefied and stored instead of converted to other material or adsorbed by other material and stored.

Generated electric power can be directly stored in a battery. In this case, a battery is provided instead of the water electrolyzing device 5, the hydrogenated aromatic compound generator 6, the toluene storage tank 7a, the methylcyclohexane storage tank 7b, the hydrogen separator 8, and the hydrogen fueled diesel power generator 9.

INDUSTRIAL APPLICABILITY

The present invention can be widely used in power generation sailing ships.

EXPLANATION OF REFERENCE NUMERALS

1 Power generation sailing ship
2 Hard sail
3 Water turbine-propeller
4 Power generator-motor
5 Water electrolyzing device
6 Hydrogenated aromatic compound generator
7a Toluene storage tank
7b Methylcyclohexane storage tank
8 Hydrogen separator
9 Hydrogen fueled diesel generator
10 Inverter switching board
11 Cargo space
12 Bow water ballast tank
13 Wheel house
14 Accommodation space
15 Course selecting device
16 Fuel cell battery
17 Pod type power generator-motor

The invention claimed is:

1. A zero emission power generation sailing ship comprising a sail provided on a deck, a water turbine-propeller, a power generator-motor which is driven by the water turbine-propeller operating as a water turbine and drives the water turbine-propeller operating as a propeller, and an energy storage device for converting the electric energy into energy of a substance and storing the substance, wherein the water turbine-propeller operates as a water turbine and the power generator-motor operates as a power generator so as to generate electric power and a part of the generated electric power is consumed for electric demand in the ship and residual part of the generated electric power is stored in the energy storage device when the wind is strong, while the power generator-motor operates as a motor and the water turbine-propeller operates as a propeller and a part of the electric power drawn from the energy storage device is consumed for the electric demand in the ship and residual part of the electric power is consumed for driving the power generator-motor operating as a motor when the wind is light, and comprising a water electrolyzing device driven by the electric power generated by the power generator-motor, a hydrogenated aromatic compound generator for reacting aromatic compound with hydrogen generated by the water electrolyzing device so as to generate hydrogenated aromatic compound, an aromatic compound storage tank, a hydrogenated aromatic compound storage tank, a hydrogen separator for separating hydrogenated aromatic compound into hydrogen and aromatic compound, and a hydrogen fueled power generator.

2. A zero emission power generation sailing ship of claim 1, wherein the hydrogen fueled power generator is a hydrogen fueled diesel engine.

3. A zero emission power generation sailing ship of claim 1, wherein the hydrogen fueled power generator is a fuel cell battery.

4. A zero emission power generation sailing ship of claim 1, wherein the aromatic compound is benzene, toluene or naphthalene, and hydrogenated aromatic compound is cyclohexane, methylcyclohexane or decalin.

5. A zero emission power generation sailing ship of claim 2, wherein the aromatic compound is benzene, toluene or naphthalene, and hydrogenated aromatic compound is cyclohexane, methylcyclohexane or decalin.

6. A zero emission power generation sailing ship of claim 3, wherein the aromatic compound is benzene, toluene or naphthalene, and hydrogenated aromatic compound is cyclohexane, methylcyclohexane or decalin.

7. A zero emission power generation sailing ship of claim 1, comprising a course selecting device provided with a computer program containing instructions to select course based on ocean wind forecasting data so as to prevent exhaustion of the electric power stored in the energy storage device.

* * * * *